United States Patent [19]
Gottwald et al.

[11] Patent Number: 5,899,439
[45] Date of Patent: May 4, 1999

[54] HANDLE WITH ADJUSTABLE STOP FOR FLOW-CONTROL VALVE

[75] Inventors: Adolf Gottwald, Iserlohn; Wilfried Köster, Menden, both of Germany

[73] Assignee: Friedrich Grohe AG, Hemer, Germany

[21] Appl. No.: 08/753,313

[22] Filed: Nov. 22, 1996

[30] Foreign Application Priority Data

Dec. 7, 1995 [DE] Germany .......................... 195 45 587

[51] Int. Cl.⁶ .................................................. F16K 35/04
[52] U.S. Cl. ............................ 251/288; 251/99; 251/297
[58] Field of Search ................................ 251/99, 98, 96, 251/297, 288

[56] References Cited

U.S. PATENT DOCUMENTS

| | | |
|---|---|---|
| 3,693,874 | 9/1972 | Fox . |
| 4,089,347 | 5/1978 | Christo ................................. 251/288 X |
| 4,549,716 | 10/1985 | Warren ...................................... 251/96 |
| 4,577,831 | 3/1986 | DiBartolo . |
| 4,733,688 | 3/1988 | Lorch ................................. 251/288 X |
| 5,082,023 | 1/1992 | D'Alayer De Costemore D 'Arc 251/288 X |
| 5,364,065 | 11/1994 | Tauati ....................................... 251/96 |
| 5,421,364 | 6/1995 | Humpert . |
| 5,522,429 | 6/1996 | Bechte et al. ...................... 251/288 X |

FOREIGN PATENT DOCUMENTS

| | | |
|---|---|---|
| 40015 | 3/1929 | Denmark ................................. 251/96 |
| 282335 | 2/1931 | Denmark ................................. 251/96 |
| 114245 | 1/1968 | France . |
| G 9209111 | 10/1982 | Germany . |
| 4308762 | 9/1994 | Germany . |
| 7301756 | 8/1972 | Netherlands . |
| 931202 | 7/1963 | United Kingdom . |
| 2133511 | 7/1984 | United Kingdom . |

*Primary Examiner*—John Rivell
*Assistant Examiner*—Meredith H. Schoenfeld
*Attorney, Agent, or Firm*—Herbert Dubno; Amdrew Wilford

[57] ABSTRACT

A valve has a valve housing and a stem projecting from the housing and rotatable relative thereto about an axis. A handle assembly for the valve has an abutment directed angularly in one direction of the axis and fixed relative to the housing, a knob, and formations on the knob and stem for rotationally fixing the knob on the stem and for axial displacement of the knob on the stem between a normal use position and an override position. A knob abutment projecting axially from the knob is directed angularly opposite the housing abutment. The knob abutment is angularly engageable with the housing abutment in the normal use position but is able to pass angularly past the housing abutment in the override position. Thus the knob is in the normal use position most of the time. In order, however, to gain increased flow, a higher temperature, or divert water from the tub to the shower, it is displaced into the override position. The same knob used for flow control or temperature adjustment is simply pulled or pushed as it is turned, normally pulled, in order to go beyond the normal end position defined by engagement of the abutments with each other.

15 Claims, 3 Drawing Sheets

HANDLE WITH ADJUSTABLE STOP FOR FLOW-CONTROL VALVE

FIELD OF THE INVENTION

The present invention relates to a handle for a flow-control valve. More particularly this invention concerns such a handle having an adjustable stop.

BACKGROUND OF THE INVENTION

In commonly owned U.S. Pat. No. 5,421,364 a flow-control valve is disclosed having a valve housing and a valve element in the housing rotatable about an axis through at most 360° between a fully open position for substantially unimpeded fluid flow through the housing and a fully closed position for substantially no fluid flow through the housing and through intermediate positions for intermediate levels of flow through the housing. A spindle coupled to the element extends along and is jointly pivotal with the element about the axis. A handle or knob fixed on the spindle is provided offset from the axis with a handle stop so that the handle stop orbits about the axis as the handle and spindle are rotated to adjust the valve. An abutment body or sleeve fixed on the housing adjacent the knob carries a housing stop that is radially deflectable on the abutment body between a normal position angularly engageable with the handle stop for limiting angular movement of the handle and spindle and a deflected position out of angular engagement with the handle stop and permitting unimpeded angular movement of the handle.

Thus with this system the stop normally limits the angular stroke or travel of the valve spindle. This housing stop can, however, be depressed radially to let the handle stop pass, allowing the full range of adjustment to the handle.

While such a system is relatively effective, the radially depressible button is an extra part that increases construction costs. In addition manipulating such a valve requires a simultaneous radial pressure and rotation, just the type of unpopular biaxial actuation used for uncapping medicine containers to prevent casual opening and making even intentional use difficult.

OBJECTS OF THE INVENTION

It is therefore an object of the present invention to provide an improved handle assembly for a flow-control valve.

Another object is the provision of such an improved handle assembly for a flow-control valve which overcomes the above-given disadvantages, that is which is of simple construction and which is easy to operate.

SUMMARY OF THE INVENTION

A valve has a valve housing and a stem projecting from the housing and rotatable relative thereto about an axis. A handle assembly for the valve has according to the invention an abutment directed angularly in one direction of the axis and fixed relative to the housing, a knob, and formations on the knob and stem for rotationally fixing the knob on the stem and for axial displacement of the knob on the stem between a normal use position and an override position. A knob abutment projecting axially from the knob is directed angularly opposite to the housing abutment. The knob abutment is angularly engageable with the housing abutment in the normal use position but is able to pass angularly past the housing abutment in the override position.

Thus the knob is in the normal use position most of the time. In order, however, to gain increased flow, a higher temperature, or divert water from the tub to the shower, the knob is displaced into the override position. The same knob used for flow control or temperature adjustment is simply pulled or pushed as it is turned, normally pulled for safety's sake, in order to go beyond the normal end position defined by engagement of the abutments with each other.

The handle assembly according to the invention further has means, typically a simple compression spring, engaged between the knob and the valve housing for urging the knob into the normal use position.

An abutment ring fixed on the valve housing according to the invention is formed centered on the axis with an angularly extending arcuate groove having an end constituting the housing abutment. The knob abutment engages into this groove in the normal use position. The knob abutment is a pin formed on the knob.

The knob abutment is an angularly elongated and axially projecting rib formed on the knob. The knob is formed by an inner part axially and rotationally fixed on the spindle, and an outer part axially displaceable but nonrotatable on the inner part. The spring is braced axially between the inner and outer parts to urge the knob into the normal use position.

The housing in accordance with this invention is provided with an axially extending sleeve centered on the axis and the outer part is formed with an axially open groove centered on the axis and axially slidably receiving the sleeve. In turn the sleeve is provided with indicia and the outer part is formed with a pointer cooperating with the indicia. At least one screw fixes the sleeve on the valve housing and splines rotationally interconnect the inner and outer parts.

In accordance with another feature of this invention one of the abutments extends at an acute angle to a plane including the axis so that the other abutment can be cammed axially by the one abutment. Thus when the end position is reached, the user need merely exert an extra force on the handle or knob to go into the override position.

The knob according to the invention moves through a stroke of between 1 mm and 10 mm between its positions. The valve can be a flow-control valve, a temperature-control valve, or a diverter and flow-control valve and controls flow to one user in the normal position and to another user in the override position.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
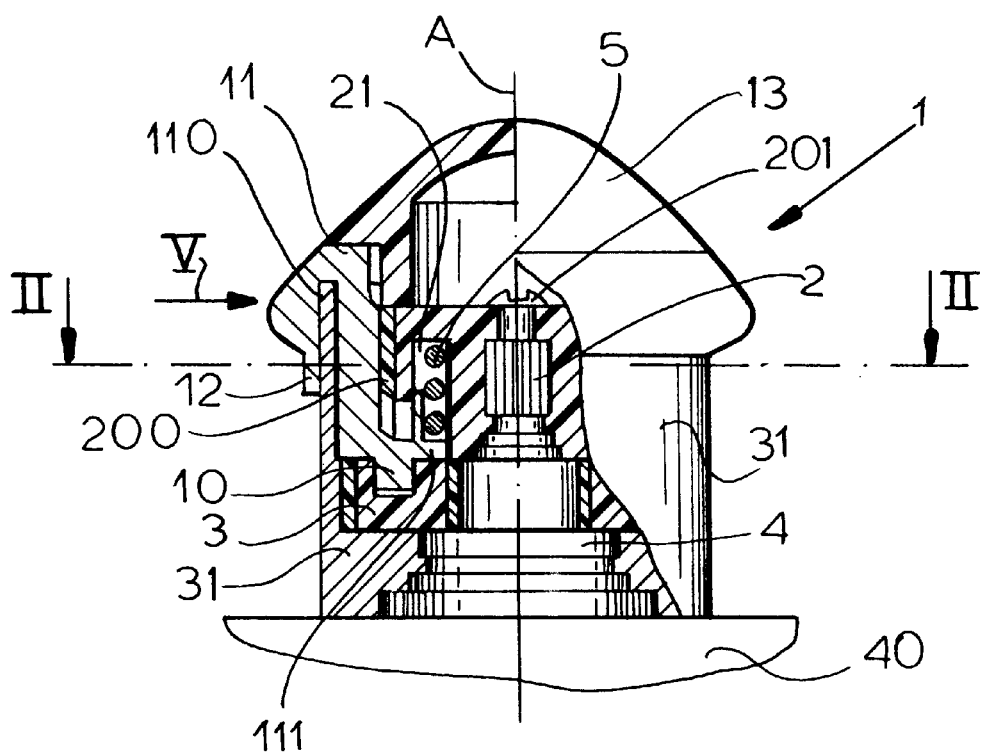
FIG. 1 is a side view partly in axial section through the handle assembly in the normal use position.
Figure 2:
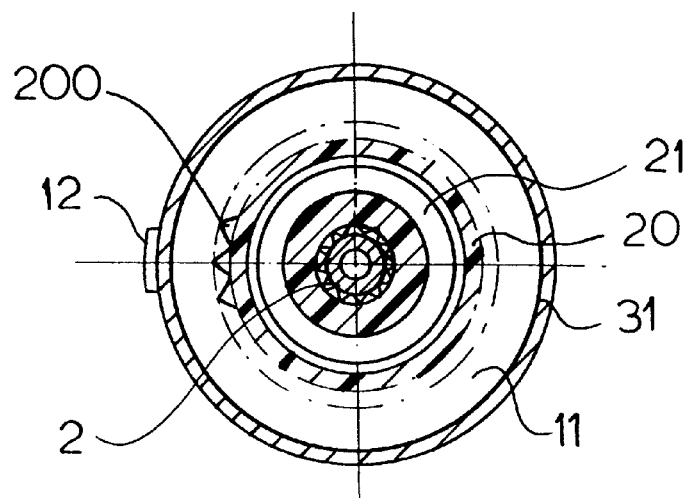
FIG. 2 is a section taken along line II—II of FIG. 1.

As seen in FIGS. 1 and 2 a handle assembly 1 is effective on a valve 4 having a housing 40 from which extends a stem 2 rotatable about an axis A but nondisplaceable along this axis A. An inner part or guide sleeve 20 is secured by a screw 201 to the stem 2 and has splines interfitting with splines on this stem 2 so that this inner part 20 is fixed against axial and angular movement on the stem 2. A knob outer part 11 is coupled by splines 200 to the inner part 20 so as to be rotationally coupled to it while being able to move axially on it through a stroke of 1 mm to 10 mm, preferably 3 mm. An abutment 10 formed as an axially downwardly projecting pin offset from the axis A is formed on the bottom of the outer part 11 as well as a lip or ledge 111 that extends underneath the inner part 20.

Underneath the parts 11 and 20 is an abutment ring 3 secured by splines 111 in an outer valve housing element 31 having a base 312 secured by at least one screw 311 to the housing 40. This abutment ring 3 is formed as shown in FIG. 4 with an arcuate groove 30 having ends 301 forming abutments for the pin 10. The inner part 20 is formed above the lip 111 with an axially downwardly open annular groove 21 holding a compression spring 5 that is centered on the axis A and that bears axially outward the inner part 20 fixed to the stem 2 and axially inward the ledge 111 of the outer part 11. Thus this spring 5 urges the outer part 11 down into the use position of FIG. 1 with its abutment pin 10 engaged in the groove 30. The outer element 31 has an upwardly extending sleeve 310 that engages in a complementary groove 110 of the outer knob part 11 that is axially so deep that even in the raised override position of FIG. 3 the sleeve 310 is still well engaged in the groove 110.

Figure 5:
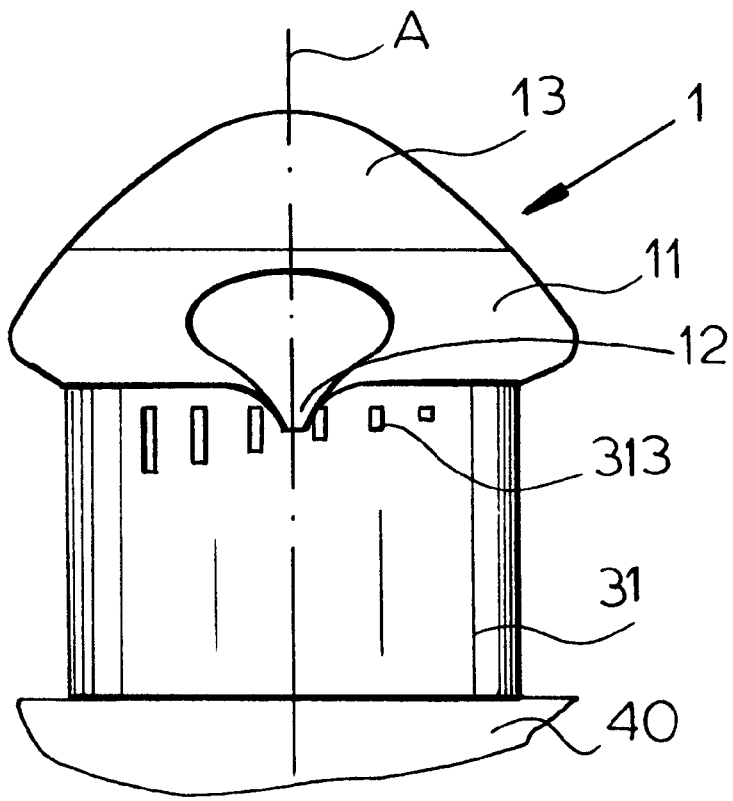
FIG. 5 is a view in the direction of arrow V of FIG. 1.

The outer knob part 11 carries a removable end cap 13 that covers up the screw 201 and that can provide a designer accent. It is also formed with a pointer 12 (FIG. 5) movable relative to indicia 313 on the outer housing element 31 so as to indicate the set position of the knob assembly 1.

During normal use of the valve the movable outer knob part 11 is in the position of FIG. 1 with the abutment pin 10 engaged in the groove 30. In this position there is only a 90° adjustment range as defined by the travel of the pin 10 in the groove 30 as can be seen in FIG. 4.

Figure 3:
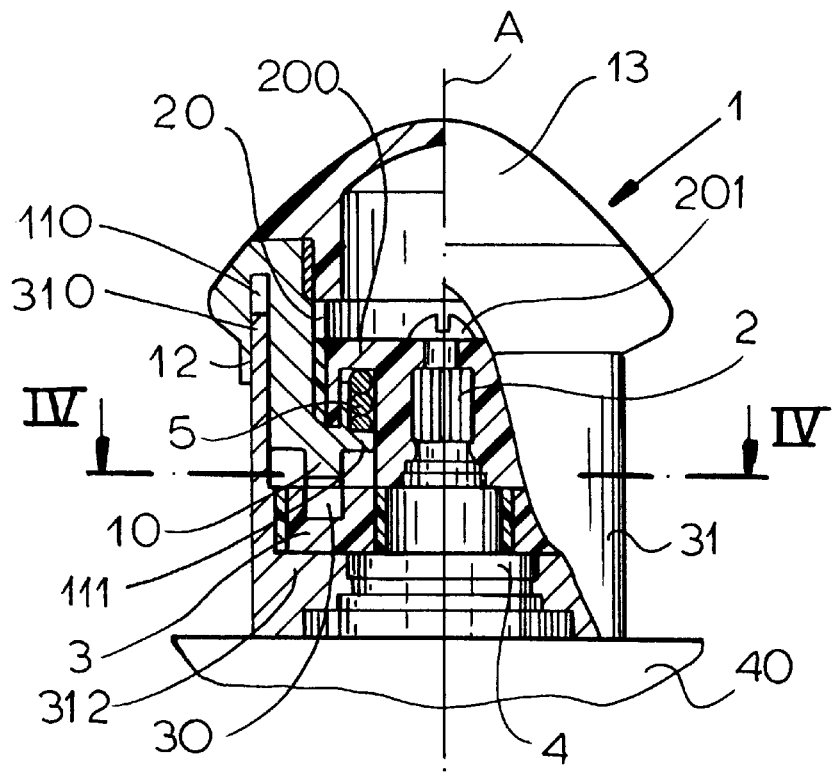
FIG. 3 is a view like FIG. 1 but with the valve in the override position.
Figure 4:
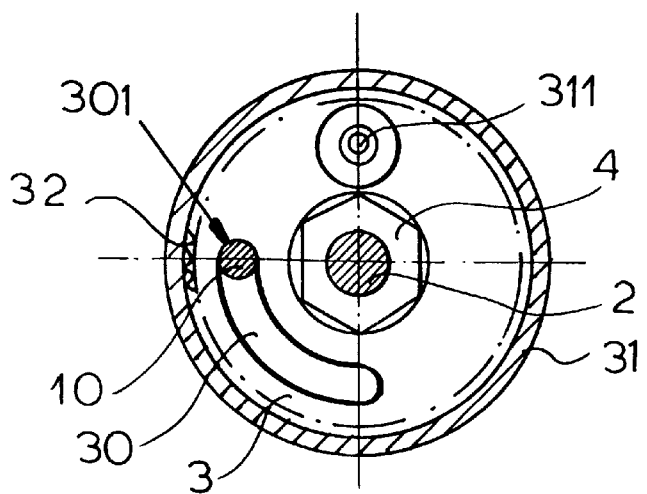
FIG. 4 is a section taken along line IV—IV of FIG. 3.

For a wider range of adjustment the knob head formed by the parts 11 and 20 is raised as indicated in FIG. 3. This pulls the pin 10 completely out of the groove 30 and allows movement of the knob parts 11 and 20 into any desired position, not limited by the travel of the abutment pin 10 in the abutment groove 30. The spring 5 automatically returns the valve to the normal use position, snapping the pin 10 into the groove 30 when they are again aligned with each other.

The valve can be adjusted by removing the parts 11 and 20 and lifting out the ring 3 so that it can be reinstalled in a different angular position. The splines 111 permit it to be set in virtually any position.

Figure 6:
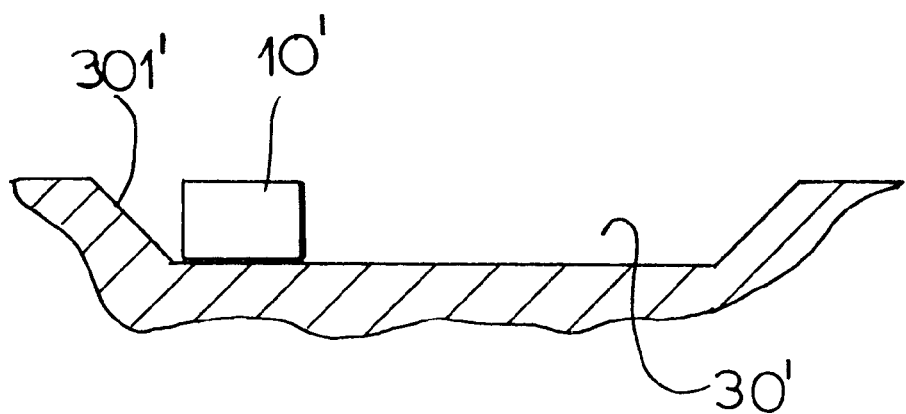
FIG. 6 is a sectional view of a detail of an alternative arrangement according to the invention.

In an arrangement shown in FIG. 6 a groove 30' like the groove 30 has angled ends 301' that serve to cam up an abutment rib 10' and the element 11 it is formed on. Thus when the end of the stroke is reached, the user need merely exert some extra force to adjust beyond the end position. This will cam up the abutment 10 and allow it to move angularly farther along. The difference in angular dimension between the rib 10' and the groove 30' determines the extent of adjustment in the normal use position.

The knob assembly 1 according to this invention can also be used on a simple flow-control valve 4 so as to provide an upper limit to the flow rate through the knob for energy-conservation purposes, this upper flow rate of course being overridable. Alternately the valve 4 can be a temperature-control valve with the end position serving a safety function to prevent the dispensing of water that is too hot. If the valve 4 is a tub/shower diverter valve it can normally operate to control flow to the tub, but when the knob outer part 11 is pulled and twisted into the override position, it diverts flow to the shower instead.

We claim:

1. In combination with a valve having a valve housing and a stem projecting from the housing and rotatable relative thereto about an axis between a pair of end positions and through an intermediate position therebetween, a handle assembly comprising:

a pair of angularly spaced housing abutments directed angularly of the axis and fixed relative to the housing;

a knob;

means including formations on the knob and stem for rotationally fixing the knob on the stem and for axial displacement of the knob on the stem between a normal use position and an override position; and a knob abutment projecting axially from the knob and directed angularly opposite the housing abutment, the knob abutment being angularly engageable with and angularly displaceable between the housing abutments in the normal use position but being able to pass angularly past one of the housing abutments in the override position, the stem being in one of its end positions when the knob abutment is engaged with the other of the housing abutments, being in its intermediate position when the knob abutment is engaged with the other of the housing abutments, and being in its other end position when the knob abutment has passed angularly past the one housing abutment.

2. The handle assembly defined in claim 1, further comprising means engaged between the knob and the valve housing for urging the knob into the normal use position.

3. The handle assembly defined in claim 2 wherein the urging means is a spring braced axially against the knob.

4. The handle assembly defined in claim 1, further comprising an abutment ring fixed on the valve housing and formed centered on the axis with an angularly extending arcuate groove having an end constituting the housing abutment and into which the knob abutment engages in the normal use position.

5. The handle assembly defined in claim 4 wherein the knob abutment is a pin formed on the knob.

6. In combination with a valve having a valve housing and a stem projecting from the housing and rotatable relative thereto about an axis, a handle assembly comprising:

a housing abutment directed angularly in one direction of the axis and fixed relative to the housing;

a knob formed by
an inner part axially and rotationally fixed on the spindle, and
an outer part axially displaceable but non-rotatable on the inner part;

means including formations on the knob and stem for rotationally fixing the knob on the stem and for axial displacement of the knob on the stem between a normal use position and an override position;

a knob abutment protecting axially from the knob and directed angularly opposite the housing abutment, the knob abutment being angularly engageable with the housing abutment in the normal use position but being able to pass angularly past the housing abutment in the override position; and a spring braced axially between the inner and outer parts urging the knob into the normal use position.

7. The handle assembly defined in claim 6 wherein the housing is provided with an axially extending sleeve centered on the axis and the outer part is formed with an axially open groove centered on the axis and axially slidably receiving the sleeve.

8. The handle assembly defined in claim 7 wherein the sleeve is provided with indicia and the outer part is formed with a pointer cooperating with the indicia.

9. The handle assembly defined in claim 7, further comprising at least one screw fixing the sleeve on the valve housing.

10. The handle assembly defined in claim 7, further comprising splines rotationally interconnecting the inner and outer parts.

11. In combination with a valve having a valve housing and a stem projecting from the housing and rotatable relative thereto about an axis, a handle assembly comprising:

a housing abutment directed angularly in one direction of the axis and fixed relative to the housing;

a knob;

means including formations on the knob and stem for rotationally fixing the knob on the stem and for axial displacement of the knob on the stem between a normal use position and an override position; and a knob abutment projecting axially from the knob and directed angularly opposite the housing abutment, the knob abutment being angularly engageable with the housing abutment in the normal use position but being able to pass angularly past the housing abutment in the override position, one of the abutments extending at an acute angle to a plane including the axis, whereby the other abutment can be cammed axially by the one abutment.

12. The handle assembly defined in claim 1 wherein the knob moves through a stroke of between 1 mm and 10 mm between its positions.

13. The handle assembly defined in claim 1 wherein the valve is a flow-control valve.

14. The handle assembly defined in claim 1 wherein the valve is a temperature-control valve.

15. The handle assembly defined in claim 1 wherein the valve is a flow control valve and is in a closed position when the abutments engage each other.

\* \* \* \* \*